Patented Jan. 19, 1926.

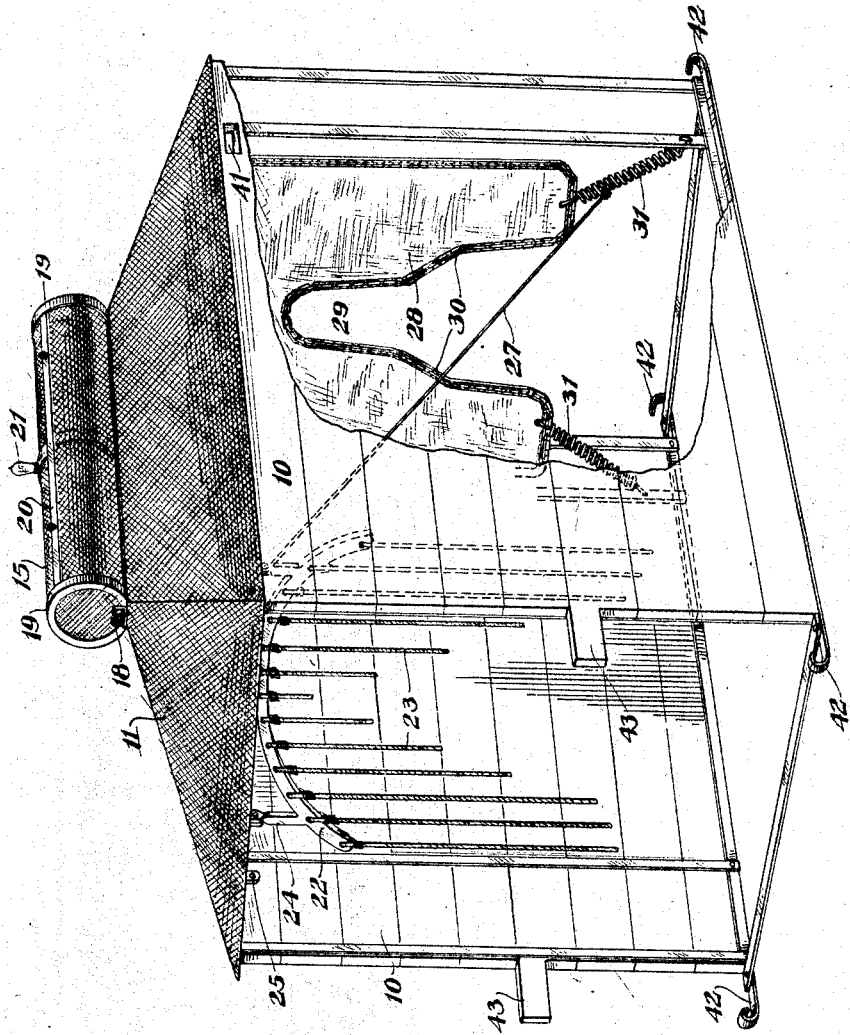

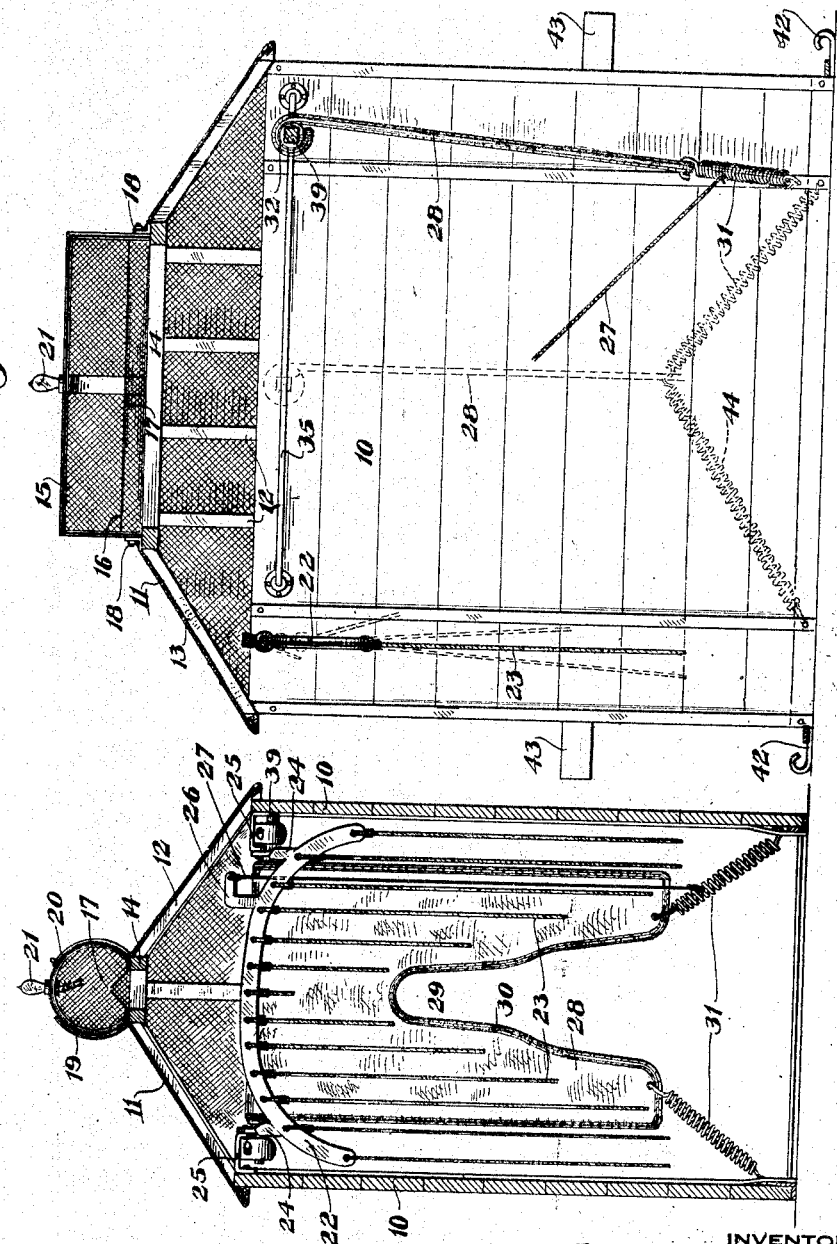

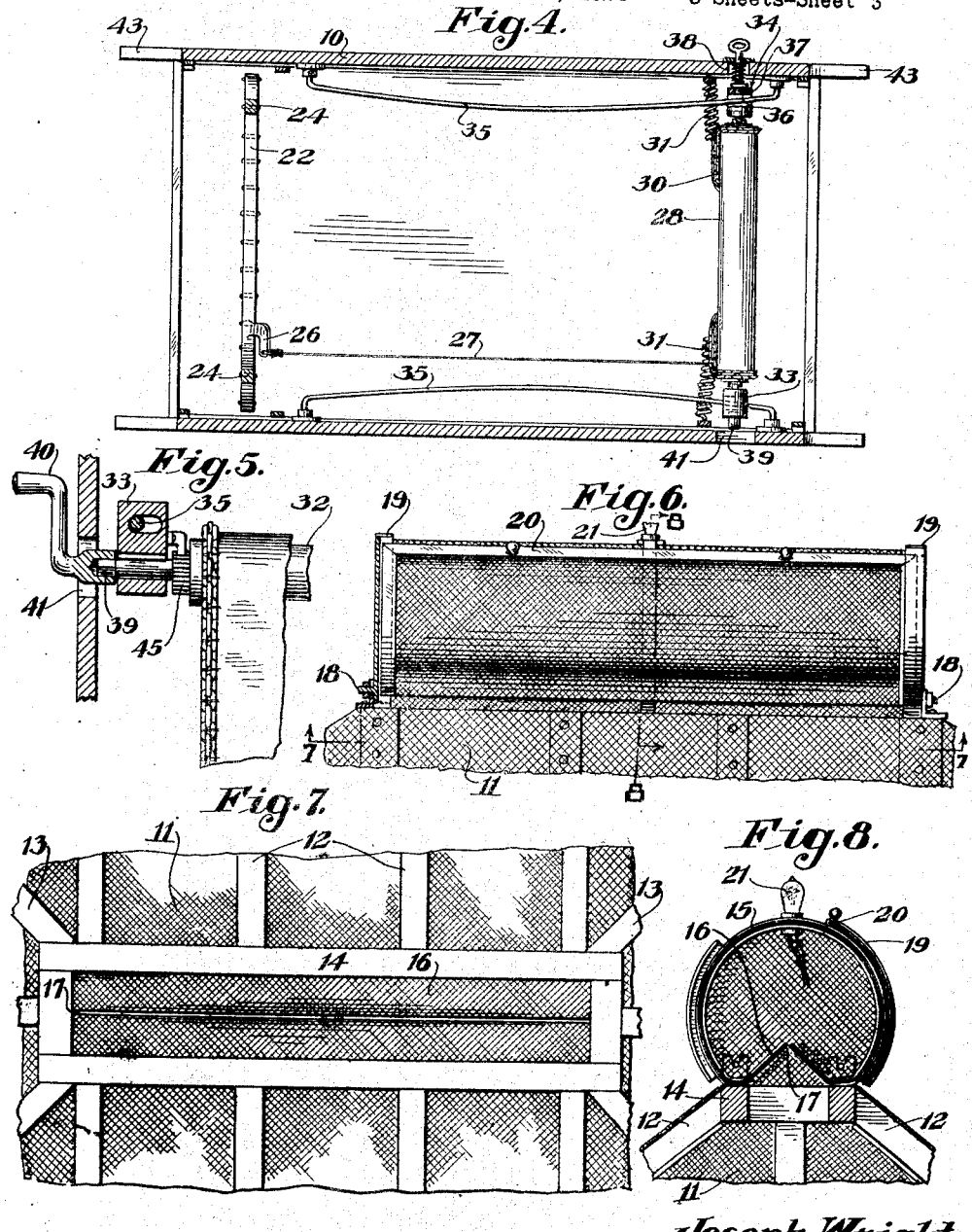

1,569,904

UNITED STATES PATENT OFFICE.

JOSEPH WRIGHT, OF LANCASTER, WISCONSIN.

TRAP FOR CATTLE FLIES.

Application filed March 21, 1924. Serial No. 700,912.

*To all whom it may concern:*

Be it known that I, JOSEPH WRIGHT, a citizen of the United States, residing at Lancaster, in the county of Grant and State of Wisconsin, have invented a new and useful Trap for Cattle Flies, of which the following is a specification.

This invention relates to a device for trapping cattle flies, and its general object is to provide a trap of simple and inexpensive construction, so designed that it will brush the flies from the cattle passing therethrough, and at the same time take advantage of the natural instinct of the flies to seek the light to thereby entrap them.

The device also has various adjustable features by means of which it may be especially adapted for cattle of different sizes, and for various conditions under which it is used.

The invention consists further in various details of construction and combinations of elements which will be more specifically explained in the following detailed description, which is to be read in connection with the accompanying drawings illustrating the invention in its preferred form.

In the drawings:

Figure 1 is a perspective view of the invention, with a portion broken away in order to illustrate better the interior construction.

Figure 2 is a vertical transverse section through the invention.

Figure 3 is a vertical longitudinal section thereof.

Figure 4 is a horizontal section.

Figure 5 is a detail sectional view illustrating the means for adjusting the device for cattle of different sizes.

Figure 6 is a detail sectional view showing the fly cage.

Figure 7 is a horizontal section taken on the line 7—7 of Figure 6, looking upward.

Figure 8 is a sectional view taken on the line 8—8 of Figure 6.

The device, of which my invention forms a part, includes two spaced side walls 10, defining a passageway through which the cattle may pass, and which is covered by a screen 11, supported on common rafters 12 and hip-rafters 13, after the manner of a hip-roof, and converging toward the top in a pair of spaced ridge-poles 14. Resting on these ridge-poles is a fly cage 15, also formed of screening and substantially cylindrical in shape, but having its lower portion turned inwardly, as shown at 16, so as to converge upwardly from the ridge-poles 14 to a restricted opening 17 extending throughout the length of the cage, and barely wide enough for the flies to pass through. The cage 15 may be removably secured to the roof by means of ears 18, or by other suitable means. The screening, which forms the cage, is supported on a suitable skeleton framework, including inturned end flanges 19 which form a guideway, which slidably receives the ends of a closure 20. This closure may be used for closing the lower portion of the cage when the latter is removed for the purpose of destroying the flies, and prevents their possible escape from the cage.

Flies when disturbed instinctively rise, and in carrying out my invention means are provided for dislodging the flies from the cattle as they pass through the passageway, and the flies, instinctively rising, are guided by the upwardly converging screen 11, and the converging portions 16 of the cage, toward the cage inlet opening 17. Advantage is further taken of the natural instinct of flies to seek the light by placing an electric lamp 21 on the upper side of the cage 15, near the center thereof.

The means for dislodging or brushing the flies from the cattle includes a curved bar 22, located near one end of the passageway, and supporting an apron formed of a series of spaced flexible elements 23, which depend therefrom, and are progressively shorter from the outer ends toward the center of the bar to conform approximately to the shape of the animal's back. The bar 22 is supported by upwardly projecting arms 24, which are pivotally mounted on brackets 25, secured to the upper portions of the walls 10. Another arm 26 projects upwardly from the bar 22 beyond its pivot, and has a cord 27 connected to its extremity by means of which the bar 22 may be rocked about the pivot to agitate the flexible elements 23. The bar 22 is located near the entrance to the passageway, and the flexible elements 23 are sufficiently spaced, so that the flies dislodged thereby will not be prevented from passing upwardly, and between the same toward the lamp 21.

Another apron 28 is normally supported near the other end of the passageway, and has a portion cut away, as at 29, to conform approximately to the neck and shoulders of the animal. The apron 28 has a chain 30, or other flexible element of considerable weight, sewed into its periphery. Thus, the edges of the apron will engage the shoulders and sides of the animal with sufficient force, so that it will be impossible for any flies to remain thereon. This engagement is further assisted by coiled springs 31, connecting the lower corners of the apron to the lower portions of the side walls 10. The lower end of the cord 27 is also connected to one of the springs 31, so that as the animal passes out beneath the apron 28, all of the flies are dislodged from its shoulders and back, while the stretching of the apron and springs 31, cause the bar 22 to be rocked, and the flexible elements 23 to be agitated. These flexible elements are long enough so that their lower portions will brush against the flanks and haunches of the animal as it passes through, and will dislodge the flies therefrom.

The apron 28 is mounted at its upper end on a roller 32, which is journaled at its ends in blocks 33 and 34, slidably supported on rods 35, secured to and extending longitudinally along the inner sides of the walls 10. One of the blocks, as 34, is provided with a slot or recess 36 adapted to removably receive the inner end of a spring held pin 37, which is supported within a slot 38 in the adjacent side wall 10. Ordinarily, when the trap is used as described above, the block 34 is thus secured near the outlet end of the passageway, and the animal will always pass therethrough in the direction indicated. The opposite end of the roller 32 is provided with a non-circular end 39 adapted to receive a crank 40, which may be inserted through a slot 41 in the adjacent wall 10 for adjusting the apron 28 vertically for cattle of different sizes. A ratchet, or similar device 45, may be provided for retaining the roller and apron in their adjusted relations.

Runners 42 and handles 43 may be provided for convenience in moving the device from place to place. It may be found preferable, however, under certain conditions, to permit the cattle to pass through the device in both directions. It is then preferred to have the apron 28 located near the center of the passageway, as shown in dotted lines in Figure 3. Under such conditions, the lower ends of the apron 28 are provided with additional coiled springs 44, which, together with the springs 31, connect the lower ends of the apron with both ends of the passageway. In this position, the action of the apron will be the same, whether the animal passes through in one direction or the other. After the animal has passed through, the apron will be restored approximately to its central position by the tension of the springs 44 or 31, as the case may be.

From the foregoing description, it will be obvious that when the animal passes through the trap all of the flies will be dislodged, and following the natural instincts of flies when disturbed, they will rise up and naturally seek the light. They will, therefore, be guided toward the opening 17, and into the cage. Very few flies, which have been dislodged from the animal, will fail to reach the inside of the cage. The cage may be easily removed from time to time, and its contents destroyed. The slidable closure 20 will prevent any possibility of their escape when the cage is removed.

While I have shown and described in considerable detail the structure of the invention in what is at present its preferred form, it is to be understood that various modifications may be made therein without departing from the salient features of the invention as expressed in the claims.

What is claimed is:

1. In a trap of the class described, the combination of a passageway having two opposed walls, an apron depending within and transversely of the passageway and having a weighted edge to brush flies from animals passing through the passageway, said apron being adjustable longitudinally of the passageway, contractile springs connecting the lower corners of the apron to the walls of the passageway near the bottom, and means for entrapping flies which are dislodged from an animal passing through the passageway beneath the apron.

2. In a trap of the class described, the combination of a passageway having opposed side walls, an apron depending within and transversely of the passageway, means to draw the lower corners of the apron downwardly to rub against the body of an animal passing through the passageway, a roller on which the upper end of the apron is secured, means for rotating the roller to adjust the apron vertically, longitudinally slidable blocks in which the ends of the roller are journaled, and means for entrapping flies which are dislodged from the body of the animal.

3. In a trap of the class described, the combination of a passageway having opposed side walls, an apron depending within and transversely of the passageway and having a weighted edge to brush flies from an animal passing through the passageway, a roller on which the apron is mounted for vertical adjustment, longitudinally slidable blocks in which the ends of the roller are journaled, contractile springs connecting the lower corners of the apron to the walls of the passageway near the bottom, a screen forming a cover for the passageway and converging upwardly to a restricted opening, a cage having an inlet in its bottom, means for removably securing the cage to the cover with its inlet above said opening, and means for luring the flies dislodged from the body of an animal into said cage.

4. In a trap of the class described, the combination of a passageway having side walls, a transversely disposed bar near the entrance to the passageway and having lateral arms rigidly secured thereto which are pivotally connected to the walls of the passageway, a series of spaced flexible elements depending from the bar, an apron depending within and transversely of the passageway near its other end, means connecting the lower end of the apron to said bar and operable upon displacement of the apron by an animal passing therebeneath to rock the bar and agitate the flexible elements, and means to entrap the flies dislodged by the apron and the flexible elements.

5. In a trap of the class described, the combination of a passageway having opposed side walls, a transversely disposed bar near the entrance to the passageway and having lateral arms rigidly secured thereto and pivotally connected to the walls of the passageway, a series of spaced flexible elements depending from the bar, an apron depending within and transversely of the passageway near its other end, means for adjusting the apron vertically, springs connecting the lower corners of the apron to the respective side walls near the bottoms thereof, means connecting the intermediate portion of one spring to the bar at one side of its pivotal support, whereby a displacement of the apron and springs causes a rocking movement of the bar and an agitation of the flexible elements, and means to entrap flies dislodged by said apron and flexible elements from an animal passing through said passageway.

6. In a trap of the class described, the combination of a passageway having opposed side walls, a transversely disposed bar near the entrance to the passageway and having lateral arms rigidly secured thereto with their outer ends pivotally connected to the walls of the passageway, a series of spaced flexible elements depending from the bar, an apron depending within and transversely of the passageway near its other end, means for adjusting the apron vertically to adapt it to animals of different height, springs connecting the lower corners of the apron to the side walls near the bottoms thereof, means connecting the intermediate portion of one of the springs to said bar at one side of its pivotal support, whereby to rock said bar and agitate the flexible elements when the apron and springs are displaced by an animal passing through the passageway, a screen forming a cover for the passageway and converging upwardly to a restricted opening, a cage secured to the cover, and having an inlet in its bottom above said opening whereby to entrap the flies.

7. In a trap of the class described, the combination of a passageway having opposed side walls, a transversely disposed bar near the entrance to the passageway and pivotally supported by said walls, a series of spaced flexible elements depending from the bar, an apron depending within and transversely of the passageway near its other end, means connecting the lower end of the apron to said bar at one side of its pivot and operable upon displacement of the apron by an animal passing through said passageway to rock the bar and agitate the flexible elements, a cover for said passageway converging upwardly to a restricted opening, a cage having an inlet in its bottom and secured above said opening, and means for luring flies dislodged from the animal by said apron and flexible elements into said cage.

8. In a trap of the class described, the combination of a passageway having opposed side walls, a transversely disposed curved bar near the entrance to the passageway and having supporting arms rigidly secured to and extending upwardly from the bar and having their upper ends pivotally connected to the walls of the passageway, a series of spaced flexible elements depending from the bar and progressively decreasing in length from the ends of the bar toward its center, a third arm extending upwardly from the bar beyond said pivotal connections, an apron depending within the passageway near its other end, a roller upon which said apron is mounted for vertical adjustment, springs connecting the lower corners of the apron to the side walls, a flexible element connecting the intermediate portion of one of the springs to the end of said third arm, whereby a displacement by an animal passing therebeneath will rock said bar and agitate the flexible elements, and means to entrap flies dislodged from the animal by said apron and flexible elements.

In testimony, that I claim the foregoing as my own, I have hereto affixed my signature.

JOSEPH WRIGHT.